(12) United States Patent
Comstock et al.

(10) Patent No.: US 11,539,807 B2
(45) Date of Patent: *Dec. 27, 2022

(54) SYSTEMS AND METHODS FOR WEB TO MOBILE APP CORRELATION

(71) Applicant: Bitly, Inc., New York, NY (US)

(72) Inventors: Christopher Comstock, Louisville, CO (US); Robert Platzer, Brooklyn, NY (US)

(73) Assignee: Bitly, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,568

(22) Filed: Dec. 14, 2020

(65) Prior Publication Data
US 2021/0194975 A1 Jun. 24, 2021

Related U.S. Application Data

(63) Continuation of application No. 16/577,900, filed on Sep. 20, 2019, now Pat. No. 10,868,879, which is a continuation of application No. 14/793,279, filed on Jul. 7, 2015, now Pat. No. 10,425,492.

(51) Int. Cl.
*H04L 67/50* (2022.01)
*H04L 67/02* (2022.01)
*H04L 67/146* (2022.01)

(52) U.S. Cl.
CPC ............ *H04L 67/535* (2022.05); *H04L 67/02* (2013.01); *H04L 67/146* (2013.01)

(58) Field of Classification Search
CPC ........ H04L 67/22; H04L 67/146; H04L 67/02
See application file for complete search history.

(56) References Cited

U.S. PATENT DOCUMENTS

| | | |
|---|---|---|
| 6,957,224 B1 | 10/2005 | Megiddo et al. |
| 7,072,888 B1 | 7/2006 | Perkins |
| 7,454,417 B2 | 11/2008 | Tong et al. |

(Continued)

FOREIGN PATENT DOCUMENTS

| | | | | |
|---|---|---|---|---|
| GB | 2 510 343 A | | 8/2014 | |
| GB | 2510343 A | * | 8/2014 | ........ G06F 17/30867 |

OTHER PUBLICATIONS

Adomavicius, G. et al., "Toward the Next Generation of Recommender Systems: A Survey of the State-of-the-Art and Possible Extensions," © 2005, IEEE, pp. 734-749.

(Continued)

*Primary Examiner* — Brian Whipple
*Assistant Examiner* — James Ross Hollister
(74) *Attorney, Agent, or Firm* — Foley & Lardner LLP

(57) ABSTRACT

The present application is directed to systems and methods for associating cookies of a linking system to a device identifier of the computing device. A server of a linking system can receive, from a browser of a computing device, a first request to access content via an encoded uniform resource locator (URL) link generated by the server and linked to a web page of the linking system. The server can redirect the browser of the computing device to the web page of the linking system. The server can receive a request to associate a cookie passed to a mobile application installed on the computing device with a device identifier of the computing device. The server can then associate the cookie with the device identifier.

20 Claims, 8 Drawing Sheets

---

Receive, by a server of a linking system, from an application of a computing device, a request to access content via an encoded uniform resource locator (URL) link generated by the server — Step 450

Determine, by the server, using the device identifier, that the computing device is not associated with a cookie of the linking system — Step 455

Provide, by the server, to a web browser of the computing device, a cookie of the linking system — Step 460

Associate, by the server, the cookie of the linking system with the device identifier — Step 465

(56) References Cited

U.S. PATENT DOCUMENTS

| | | | |
|---|---|---|---|
| 7,720,720 B1 | 5/2010 | Sharma et al. | |
| 8,186,572 B2 | 5/2012 | Herzig | |
| 8,271,878 B2 | 9/2012 | Kane et al. | |
| 8,281,232 B2 | 10/2012 | Vishria et al. | |
| 8,401,009 B1 | 3/2013 | Dorsey et al. | |
| 8,412,726 B2 | 4/2013 | Yan et al. | |
| 8,442,929 B2 | 5/2013 | Park et al. | |
| 8,452,772 B1 | 5/2013 | Carpio et al. | |
| 8,612,435 B2 | 12/2013 | Sambrani et al. | |
| 8,892,647 B1* | 11/2014 | Koulomzin | H04L 63/0876 709/204 |
| 9,288,118 B1* | 3/2016 | Pattan | H04L 63/102 |
| 9,990,114 B1 | 6/2018 | Horton et al. | |
| 10,019,731 B1* | 7/2018 | Wu | G06Q 30/0246 |
| 2002/0010625 A1 | 1/2002 | Smith et al. | |
| 2002/0178366 A1 | 11/2002 | Ofir | |
| 2003/0131045 A1* | 7/2003 | McGee | G06F 16/957 709/224 |
| 2005/0097204 A1 | 5/2005 | Horowitz et al. | |
| 2005/0108299 A1 | 5/2005 | Nakajima | |
| 2005/0262052 A1 | 11/2005 | Daniels et al. | |
| 2006/0242554 A1 | 10/2006 | Gerace et al. | |
| 2007/0005587 A1 | 1/2007 | Johnson et al. | |
| 2007/0022005 A1 | 1/2007 | Hanna | |
| 2007/0027864 A1 | 2/2007 | Collins et al. | |
| 2007/0038620 A1 | 2/2007 | Ka et al. | |
| 2007/0124500 A1 | 5/2007 | Bedingfield et al. | |
| 2007/0288514 A1 | 12/2007 | Reitter et al. | |
| 2008/0065659 A1 | 3/2008 | Watanabe et al. | |
| 2008/0071774 A1 | 3/2008 | Gross | |
| 2008/0133540 A1 | 6/2008 | Hubbard et al. | |
| 2008/0147780 A1 | 6/2008 | Trevor et al. | |
| 2008/0162475 A1 | 7/2008 | Meggs et al. | |
| 2009/0138472 A1 | 5/2009 | MacLean | |
| 2009/0171968 A1 | 7/2009 | Kane et al. | |
| 2009/0327275 A1 | 12/2009 | Walker et al. | |
| 2010/0070448 A1 | 3/2010 | Omoigui | |
| 2010/0100537 A1 | 4/2010 | Druzgalski et al. | |
| 2010/0153404 A1 | 6/2010 | Ghosh et al. | |
| 2010/0205541 A1 | 8/2010 | Rapaport et al. | |
| 2010/0229045 A1* | 9/2010 | Schultz | G06F 8/60 714/37 |
| 2010/0274815 A1 | 10/2010 | Vanasco | |
| 2011/0035784 A1* | 2/2011 | Jakobsson | H04L 63/1466 726/2 |
| 2011/0066613 A1 | 3/2011 | Berkman et al. | |
| 2011/0082850 A1 | 4/2011 | Ball et al. | |
| 2011/0107260 A1 | 5/2011 | Park et al. | |
| 2011/0113047 A1 | 5/2011 | Guardalben | |
| 2011/0231296 A1 | 9/2011 | Gross et al. | |
| 2011/0258204 A1 | 10/2011 | Hubbard et al. | |
| 2011/0264992 A1 | 10/2011 | Vishria et al. | |
| 2011/0295878 A1 | 12/2011 | Bennett et al. | |
| 2011/0313996 A1 | 12/2011 | Strauss et al. | |
| 2011/0314007 A1 | 12/2011 | Dassa et al. | |
| 2012/0020473 A1 | 1/2012 | Mart et al. | |
| 2012/0023390 A1 | 1/2012 | Howes et al. | |
| 2012/0072835 A1 | 3/2012 | Gross et al. | |
| 2012/0137224 A1 | 5/2012 | Carlsen et al. | |
| 2012/0210119 A1 | 8/2012 | Baxter et al. | |
| 2012/0260182 A1 | 10/2012 | Hansen et al. | |
| 2012/0278428 A1 | 11/2012 | Harrison et al. | |
| 2012/0296919 A1 | 11/2012 | Sinha et al. | |
| 2012/0296920 A1 | 11/2012 | Sahni et al. | |
| 2013/0031110 A1 | 1/2013 | Bhola et al. | |
| 2013/0036191 A1 | 2/2013 | Fink et al. | |
| 2013/0046759 A1 | 2/2013 | Grady et al. | |
| 2013/0097186 A1 | 4/2013 | Van Hoff | |
| 2013/0104038 A1 | 4/2013 | Galper et al. | |
| 2013/0110823 A1 | 5/2013 | Su et al. | |
| 2013/0124309 A1* | 5/2013 | Traasdahl | G06Q 30/02 705/14.49 |
| 2013/0124437 A1 | 5/2013 | Pennacchiotti et al. | |
| 2014/0067825 A1 | 3/2014 | Oztaskent et al. | |
| 2014/0120864 A1 | 5/2014 | Manolarakis et al. | |
| 2014/0129733 A1* | 5/2014 | Klais | H04L 45/22 709/239 |
| 2014/0317266 A1* | 10/2014 | Fuchs | G06Q 30/02 709/224 |
| 2015/0019721 A1* | 1/2015 | Zinin | H04L 67/02 709/224 |
| 2016/0142858 A1 | 5/2016 | Molinet et al. | |
| 2016/0142859 A1* | 5/2016 | Molinet | H04L 67/327 709/203 |
| 2016/0277273 A1* | 9/2016 | Arai | H04L 67/02 |
| 2016/0359945 A1 | 12/2016 | Boudville | |
| 2017/0364964 A1* | 12/2017 | Wang | G06Q 30/0275 |
| 2021/0266356 A1* | 8/2021 | Rizvi | G06Q 30/0269 |

OTHER PUBLICATIONS

Burke, R. et al., "Recommender Systems: An Overview," © 2011, AAAI, pp. 13-18.

Chen, J. et al., "Short and Tweet: Experiments on Recommending Content from Information Streams," © Apr. 2010, ACM, pp. 1185-1194.

Dachis, Google URL Shortener, aka Goo.gl, Finally Gets Its Own Web Site, Sep. 30, 2010, accessed Jan. 28, 2015.

Ekstrand, M.D. et al., "Collaborative Filtering Recommender Systems," © 2010, Foundations & Trends in Human-Computer Interaction, pp. 81-173.

Final Office Action on U.S. Appl. No. 14/793,279 dated Jan. 24, 2018.

Final Office Action on U.S. Appl. No. 15/483,627 dated Nov. 26, 2018.

Gard, N. et al., "Personalized, Interactive Tag Recommendation for Flickr," © 2008, ACM, pp. 67-74.

Glance, N. et al., "Collaborative Document Monitoring via a Recommender System," © 2000, 8 pages.

International Preliminary Report on Patentability dated Jul. 3, 2014 in PCT Application No. PCT/US2012/059233 (10 pages).

International Search Report and Written Opinion dated Jun. 4, 2013 in PCT Application No. PCT/US2012/59233.

Karypis, G., "Evaluation of Item-Based Top-N Recommendation Algorithms," © 1999, 8 pages.

Linden, G. et al., "Amazon.com Recommendations: Item-to-Item Collaborative Filtering," © 2003, IEEE, pp. 76-80.

Nkweteyim, D.L.,"A Collaborative Filtering Approach to Predict Web Pages of Interest From Navigation Patterns of Past Users Within an Academic Website," © 2005, Ph. D Thesis, Univ. of Pittsburg, 153 pages total.

Non-Final Office Action on U.S. Appl. No. 14/793,279 dated Oct. 30, 2018.

Non-Final Office Action on U.S. Appl. No. 16/701,939 dated Sep. 21, 2021.

Non-Final Office Action on U.S. Appl. No. 16/701,939 dated Dec. 7, 2020.

Notice of Allowability on U.S. Appl. No. 13/332,111 dated Nov. 2, 2016.

Notice of Allowance on U.S. Appl. No. 13/332,098 dated Dec. 14, 2016.

Notice of Allowance on U.S. Appl. No. 13/332,098 dated May 25, 2016.

Notice of Allowance on U.S. Appl. No. 13/332,111 dated Oct. 18, 2016.

Notice of Allowance on U.S. Appl. No. 14/793,279 dated May 1, 2019.

Notice of Allowance on U.S. Appl. No. 15/483,627 dated Jul. 25, 2019.

Notice of Allowance on U.S. Appl. No. 16/577,900 dated Aug. 18, 2020.

Notice of Allowance on U.S. Appl. No. 16/577,900 dated Oct. 8, 2020.

Oard, D.W. et al.,"Implicit Feedback for Recommender Systems," © 1998, AAAI, pp. 81-83.

Office Action on U.S. Appl. No. 14/793,279 dated Jan. 24, 2018.

Office Action on U.S. Appl. No. 15/483,627 dated Apr. 26, 2018.

(56) References Cited

OTHER PUBLICATIONS

Popescul, A. et al., "Probabilistic Models for Unified Collaborative and Content-based Recommendation in Sparse-Data Environments," © 2001, UAI 2001, pp. 437-444.
Resnick, P. et al., "RecommenderSystems," © 1997, ACM, pp. 56-58.
Romero, C. et al., "Applying Web Usage Mining for Personalizing Hyperlinks in Web-based Adaptive Educational Systems," © 2009, Elsevier, pp. 828-839.
Schafer, J.B. et al., "Collaborative Filtering Recommender Systems," © 2007, Springer-Verlag, pp. 291-324.
Sigurbjornsson, B. et al., "FlickrTag Recommendation based on Collective Knowledge," © 2008, WWW 2008, pp. 327-336.
Su, X. et al., "A Survey of Collaborative Filtering Techniques," © 2009, Hindawi Publishing Corp., 19 pages.
Terveen, L. et al.,"Phoaks: A System for Sharing Recommendations," © 1997, ACM, pp. 59-62.
U.S. Notice of Allowance in U.S. Appl. No. 13/332,019 dated Jul. 13, 2015.
U.S. Notice of Allowance in U.S. Appl. No. 13/332,051 dated Aug. 5, 2015.
U.S. Notice of Allowance in U.S. Appl. No. 13/332,062 dated Apr. 6, 2015.
U.S. Notice of Allowance in U.S. Appl. No. 13/332,062 dated Jul. 31, 2015.
U.S. Notice of Allowance in U.S. Appl. No. 13/332,019 dated Apr. 9, 2015.
U.S. Notice of Allowance in U.S. Appl. No. 13/332,090 dated Apr. 8, 2015.
U.S. Notice of Allowance on U.S. Appl. No. 13/332,090 dated Jul. 30, 2015.
U.S. Office Action for U.S. Appl. No. 13/332,051 dated Feb. 4, 2015.
U.S. Office Action for U.S. Appl. No. 13/332,111 dated Jan. 15, 2015.
U.S. Office Action for U.S. Appl. No. 13/332,019 dated Jun. 23, 2014.
U.S. Office Action for U.S. Appl. No. 13/332,051 dated Jun. 4, 2014.
U.S. Office Action for U.S. Appl. No. 13/332,111 dated Jun. 26, 2014.
U.S. Office Action for U.S. Appl. No. 13/332,062 dated Nov. 19, 2014.
U.S. Office Action for U.S. Appl. No. 13/332,090 dated Oct. 7, 2014.
U.S. Office Action for U.S. Appl. No. 13/332,098 dated Nov. 3, 2014.
U.S. Office Action in U.S. Appl. No. 13/332,051 dated Feb. 21, 2014.
U.S. Office Action in U.S. Appl. No. 13/332,062 dated Apr. 8, 2014.
U.S. Office Action in U.S. Appl. No. 13/332,090 dated Mar. 26, 2014.
U.S. Office Action in U.S. Appl. No. 13/332,111 dated Nov. 2, 2015.
U.S. Office Action on U.S. Appl. No. 13/332,051 dated May 22, 2015.
U.S. Office Action on U.S. Appl. No. 13/332,098 dated May 4, 2015.
U.S. Office Action on U.S. Appl. No. 13/332,098 dated Dec. 3, 2015.
U.S. Office Action on U.S. Appl. No. 13/332,111 dated Jun. 2, 2016.
U.S. Office Action on U.S. Appl. No. 14/793,279 dated Jun. 28, 2017.
U.S. Office Action on U.S. Appl. No. 16/701,939 dated Apr. 29, 2021.
Wartena, C. et al., "Using Tag Co-occurrence for Recommendation," © 2009, IEEE, pp. 273-278.
Wikipedia, URL shortening, Dec. 10, 2011, accessed Jan. 28, 2015.
Final Office Action on U.S. Appl. No. 16/701,939 dated Mar. 9, 2022.
Notice of Allowance on U.S. Appl. No. 16/701,939 dated Jul. 5, 2022.

* cited by examiner

SYSTEMS AND METHODS FOR WEB TO MOBILE APP CORRELATION

CROSS-REFERENCES TO RELATED APPLICATIONS

The present application claims priority under 35 U.S.C. § 120 as a continuation of U.S. patent application Ser. No. 16/577,900, titled "SYSTEMS AND METHODS FOR WEB TO MOBILE APP CORRELATION," filed Sep. 20, 2019, which claims priority under 35 U.S.C. § 120 as a continuation of U.S. patent application Ser. No. 14/793,279, titled "SYSTEMS AND METHODS FOR WEB TO MOBILE APP CORRELATION," filed Jul. 7, 2015, each of which is incorporated herein by reference in its entirety.

FIELD

The present application is generally directed to systems and methods for mobile to web correlation. In particular, the present application is directed to mobile to web correlation using cookies of a linking system.

BACKGROUND

Advertisers and marketers are constantly seeking ways of learning more about users via tracking online activity. With the mass adoption of smartphones and applications, tracking online activity of users has become harder.

SUMMARY

The present solution provides multiple techniques for associating cookies of a linking system set to one or more applications or browsers installed on a computing device to a device identifier of the computing device. In one aspect, the present application is directed to a method for associating cookies of a linking system set to an application installed on a computing device to a device identifier of the computing device. A server of a linking system can receive, from a browser of a computing device, a first request to access content via an encoded uniform resource locator (URL) link generated by the server and linked to a web page of the linking system. The server can redirect the browser of the computing device to the web page of the linking system. The server can receive a request to associate a cookie passed to a mobile application installed on the computing device with a device identifier of the computing device. The server can then associate the cookie with the device identifier.

In some embodiments, the web page includes a script to open a deep link of the application via the application. In some embodiments, the web page includes a script that causes the computing device to determine if the computing device includes the application, and responsive to determining that the computing device does not include the application, provide, for display, the content in a browser of the computing device.

In some embodiments, the server of the linking system can provide the cookie of the linking system to the application of the computing device. In some embodiments, the computing device is a mobile device and the application is a mobile application installed on the mobile device. In some embodiments, associating, by the server, the cookie with the device identifier includes updating, in a database, an entry including the device identifier, to include the cookie passed to the application. In some embodiments, receiving, by the server, a request to associate the cookie with the device identifier of the computing device includes receiving, by the server, the request to associate the cookie and a device identifier of the computing device from the mobile application.

In some embodiments, the application includes a first application, the web page includes a first web page, the cookie includes a first cookie, and a request to associate the cookie with the device identifier includes a first request. In some such embodiments, the server can receive, from the browser of the computing device, a second request to access content via a second encoded URL link generated by the server and linked to a second web page of the linking system. The server can redirect the browser of the computing device to the second web page of the linking system. The second web page of the linking system can include instructions to cause the computing device to launch a second application installed on the computing device and to pass, to the second application, a second cookie of the linking system. The server can receive a second request to associate the second cookie with the device identifier of the computing device and responsive to the second request, associate the second cookie with the device identifier and the first cookie.

In some embodiments, the application includes a first application, the web page includes a first web page, the cookie includes a first cookie, and a request to associate the cookie with the device identifier includes a first request. In some such embodiments, the server of the linking system can receive, from a second application of the computing device, a second request to access content via a second encoded uniform resource locator (URL) link generated by the server, the second request including the device identifier of the computing device. The server can determine, using the device identifier, that the second application of the computing device is not associated with a cookie of the linking system. The server can provide, to the second application of the computing device, a second cookie of the linking system. The server can then associate the second cookie with the device identifier and the first cookie.

In another aspect, a method for associating cookies of the linking system to a device identifier of a computing device is depicted. A server of a linking system can receive, from an application of a computing device, a request to access content via an encoded uniform resource locator (URL) link generated by the server. The request can include a device identifier of the computing device. The server can determine, using the device identifier, that the computing device is not associated with a cookie of the linking system. The server can provide, to a web browser of the computing device, a cookie of the linking system. The server can then associate, by the server, the cookie of the linking system with the device identifier.

In some embodiments, determining, by the server, using the device identifier, that the application of the computing device is not associated with a cookie of the linking system includes performing, by the server, a lookup in a database including association information between device identifiers and cookies of the linking system. In some embodiments, the system, responsive to receiving the request to access content, can redirect the computing device to a web page corresponding to the encoded URL link. The web page can include script that is configured to cause the computing device to determine that the application of the computing device is not installed on the computing device; provide, responsive to determining that the application of the computing device is not installed on the computing device, an option to install the application or access the content via a browser of the computing device; and responsive to receiving a selection to access the content via a web browser of the computing device, set the cookie of the linking system to the web browser.

In some embodiments, associating the cookie of the linking system with the device identifier includes updating, by the server, in a database, an entry including the device identifier to include the cookie passed to the web browser. In some embodiments, providing, by the server, to a web browser of the computing device, a cookie of the linking system includes providing, by the server, to a web view of an application installed on the computing device, the application identified by a script executing on a web page corresponding to the encoded URL link. In some embodiments, the computing device is a mobile device and the application is a mobile application installed on the mobile device.

According to yet another aspect, a method for associating cookies of applications to a device identifier of a computing device is described. A server of a linking system can, in response to receiving, from a browser of a computing device, a first request to access content via a first encoded uniform resource locator (URL) link, redirect the browser of the computing device, to a web page of the linking system. The web page of the linking system can include instructions to cause the computing device to determine that a first application identified via the encoded URL link is installed on the computing device, responsive to determining that the first application identified via the encoded URL link is installed on the computing device, launch the first application installed on the computing device, and pass, to the first application, a first cookie of the linking system. The server can responsive to receiving a request to associate the first cookie with a device identifier of the computing device, associate the first cookie with the device identifier. The server can then receive, from the first application of the computing device, a second request to access content via a second encoded uniform resource locator (URL) link generated by the server. The second request can include the device identifier of the computing device. The server can identify a second application of the computing device through which to access the content. Responsive to determining that the second application of the computing device does not include a cookie of the linking system, the server can provide to the second application of the computing device, a second cookie of the linking system. The server can then associate the second cookie of the linking system with the device identifier and the first cookie of the linking system.

In some embodiments, associating, by the server, the second cookie of the linking system with the device identifier and the first cookie of the linking system includes updating, by the server, in a database, an entry including the device identifier and the first cookie to include the second cookie. In some embodiments, the computing device is a mobile device and the first application is a first mobile application installed on the mobile device and the second application is a second mobile application installed on the mobile device. In some embodiments, the web page is a first web page and includes a script to open a deep link of the first application via the first application. In some embodiments, the second encoded URL link is linked to a second web page of the linking system and includes a script to open a deep link of the second application via the second application.

The details of various embodiments of the present solution are set forth in the accompanying drawings and the description below.

BRIEF DESCRIPTION OF DRAWINGS

The foregoing and other objects, aspects, features, and advantages of the present solution will become more apparent and better understood by referring to the following description taken in conjunction with the accompanying drawings, in which.

In the drawings, like reference numbers generally indicate identical, functionally similar, and/or structurally similar elements.

DETAILED DESCRIPTION

For purposes of reading the description of the various embodiments below, the following enumeration of the sections of the specification and their respective contents may be helpful:

Section A describes a network and computing environment which may be useful for practicing embodiments described herein;

Section B describes embodiments of systems and methods to shorten, track and analyze links; and Section C describes embodiments of systems and methods to associate cookies of a linking system to a device identifier of a computing device.

A. Network and Computing Environment

Figure 1A:
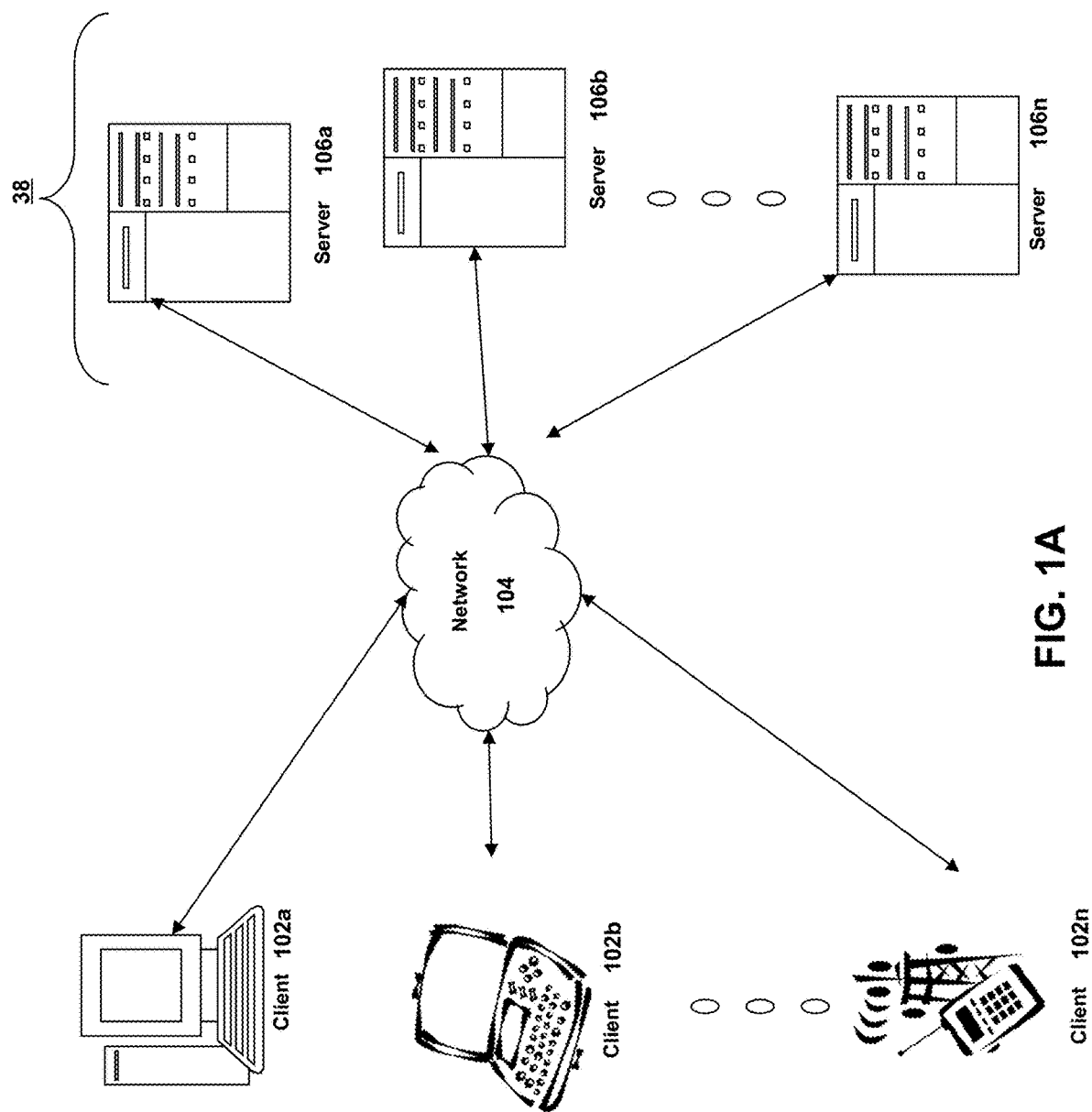
FIG. 1A is a block diagram of an embodiment of a network environment for a client to access servers.

Prior to discussing the specifics of embodiments of the systems and methods of server and/or client, it is helpful to discuss the network and computing environments in which such embodiments may be deployed. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
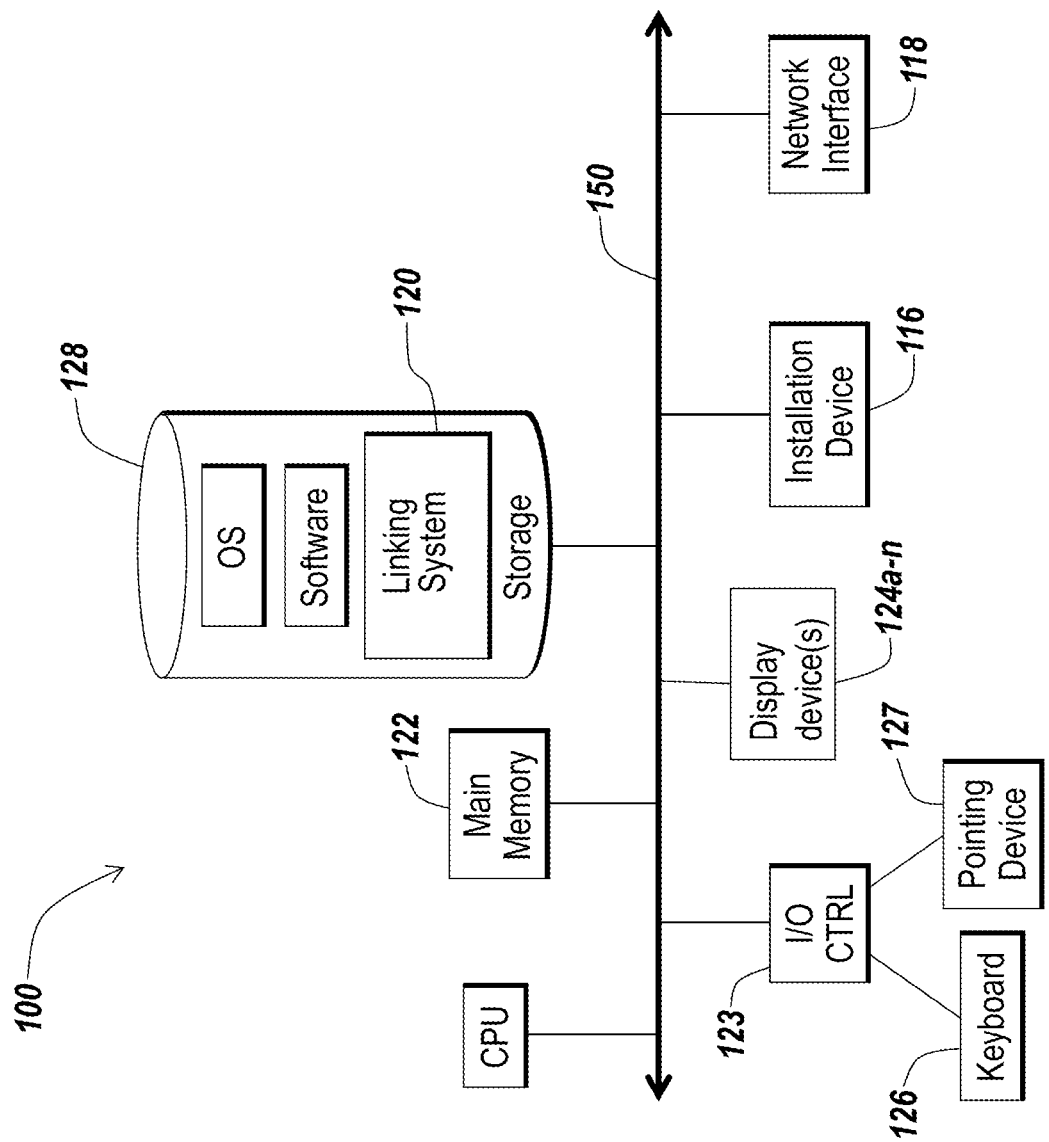
FIGS. 1B and 1C are block diagrams of embodiments of a computing device.
Figure 1C:
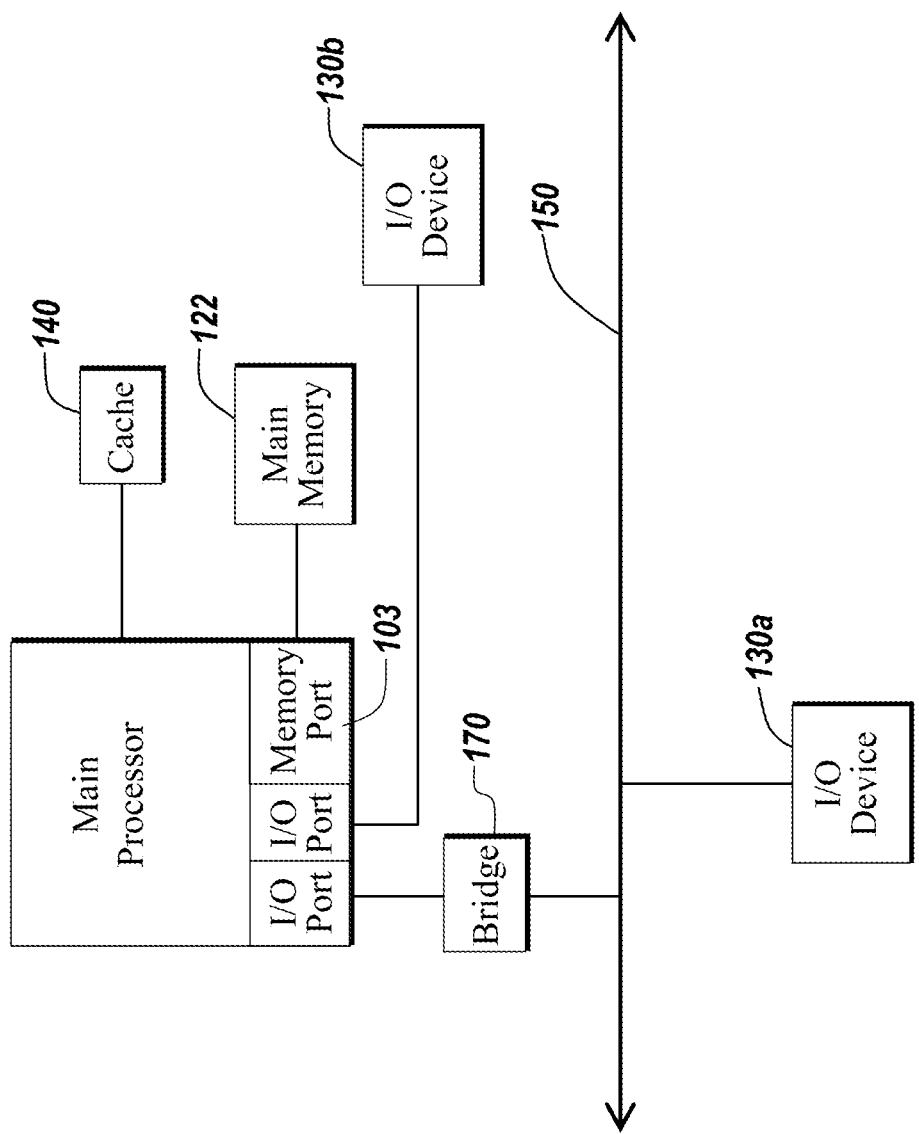

The client 102 and server 106 may be deployed as and/or executed as any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and software for sharing, tracking and analyzing links. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for sharing, tracking and analyzing links. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, WINDOWS VISTA, and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD, IPHONE, or APPLE TV family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or a NINTENDO WII device manufactured by Nintendo Co., Ltd., of Kyoto, Japan, an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, and IPOD NANO lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudimpression opportunity layer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. System for Shortening, Sharing and Tracking Links

Figure 2:
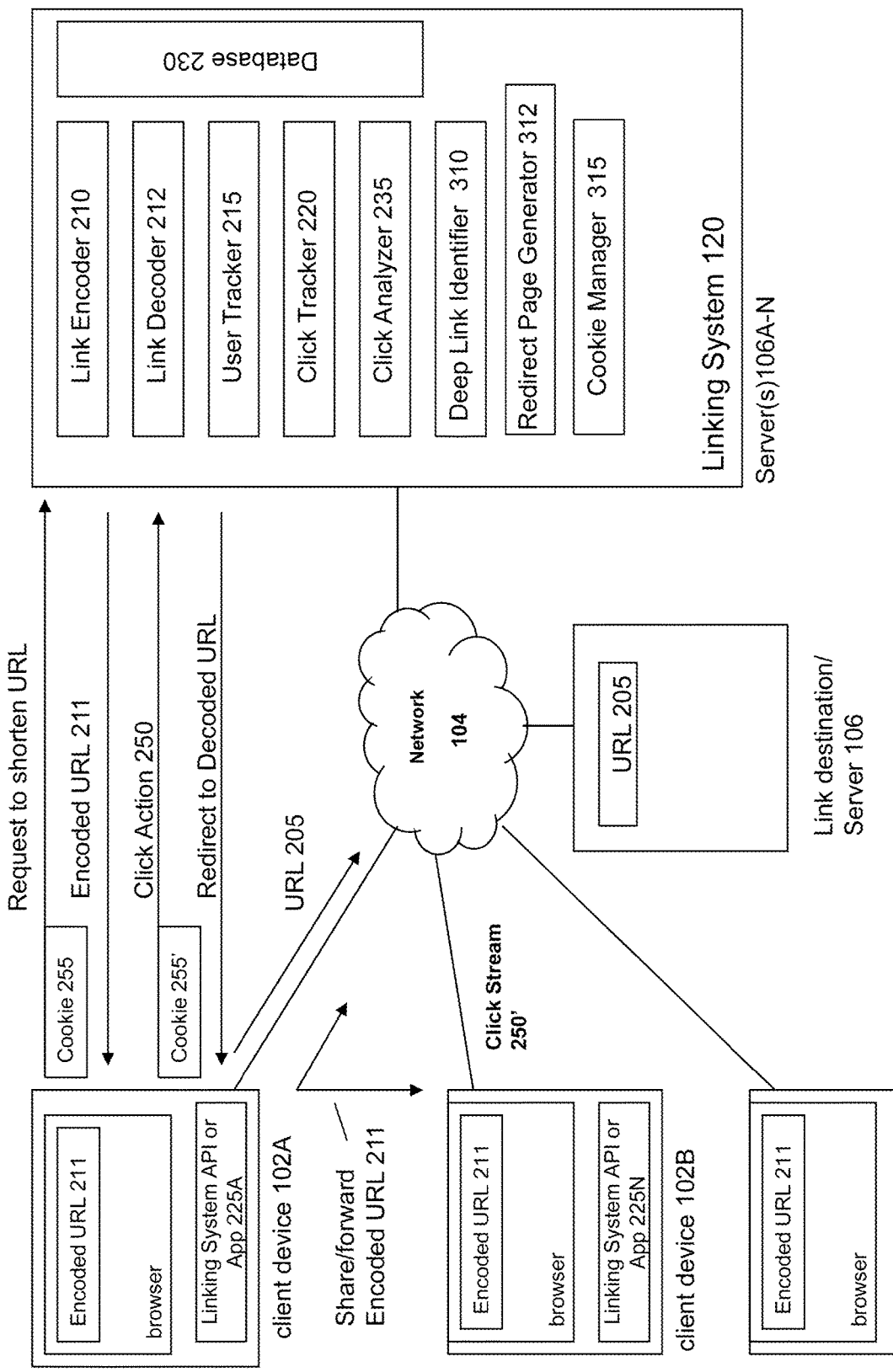
FIG. 2 is a diagram of an embodiment of a system for shortening, sharing and tracking links.

Referring now to FIG. 2, embodiments of a system 120 for shortening, sharing and tracking links is depicted. In brief overview, a linking system 120 executes on one or more server(s) 106A-N and may be accessed by a plurality of clients 102A-102N via a network 104. The linking system 120 may include a link encoder 210 that shortens a link, such as a uniform resource locator (URL) 205 to a resource on a destination server 106. The link encoder may encode (e.g., shorten) the link responsive to a request to shorten the URL 205. The client may include a linking system API or application 225A-225N to interface with the linking system 120 and request to shorten the link. The request may include a cookie 255 identifying user and client information. The link encoder 210 may generate or otherwise provide an encoded URL 211 to a client. The link encoder may store in a database 230 information about the encoding of the URL and the URL 205. The user tracker 215 may track information about the user, such as via the cookie 255 and store the information in the database 230.

Via the browser of the client, a user may click on or otherwise activate the encoded URL 211 which directs the browser to the linking system 120. The click action 250 may be a request to decode the URL. The click action or request thereof may include a cookie 255' which provides user and client information. The link decoder 212 may decode the encoded URL 211, such as via database 230. For example, the link decoder may perform a lookup of the URL corresponding to the shortened or encoded URL. The linking system, such as via decoder 212, may send a redirect, such as an Hypertext Transfer Protocol (HTTP) redirect (e.g., 301 redirect), to the client to the decoded URL 205. The browser of the client may access or be directed to the URL 205 of the link destination server 106. The click tracker 220 may track user actions on the encoded URL, such as when the encoded URL was clicked, from what source and by what user and store such tracking in the database 230. The click tracker and/or user tracker may track user information from the cookies 255' in connection with or associated with the click action 250. The click tracker and/or user tracker may track and store user the referrer information from the request.

A user of client 102A may share via email, web-site posting, social networking, etc. the encoded URL 211 to any one or more other users, such as users of clients 102B-102N. Any of these users may click on or activate the encoded URL 211. The plurality of click actions on the encoded URL provide a stream of requests from user click actions to decode the encoded URL, which may be generally referred to as a click stream 250'. The linking system via link decoder 212 may decode the encoded URL and redirect each of the clients to the URL 205. The user tracker and click tracker may track information on the user and the click actions of the client stream 250' in the database. The click analyzer 235 may provide metrics on the click actions of the encoded URL, such as the number of clicks, the times of clicks and the sources of the clicks.

In further details, the linking system 120 may comprise an application, program, library, process, service, script, task or any type and form of executable instructions executable or executing on a device. The linking system may operate on a plurality of servers 106A-106N. The linking system may comprise logic, function, and operations for shortening, sharing and tracking links, such as URLs. The linking system may comprise application programming interfaces, such as web services, XML, JSON, etc. for accessing the functionality, operations and/or data of the linking system. The linking system may include one or more modules, components or executables for providing these APIs and performing the function and operations described herein. For example, in some embodiments, the linking system may include a link encoder 210, a link decoder 212, a user tracker 215, a click tracker 220 and a click analyzer 235. The modules, components or executables of the linking system may operate in a client/server architecture. The modules, components or executables of the linking system may operate in a distributed manner across multiple devices.

The linking system may include, operate, communicate or interface with a linking system API or application 225A-225N (generally referred to as 225). In some embodiments, an application 225 may execute on the client that communicates with or interfaces to the linking system to encode and decode URLs. In some embodiments, an application 225 may include any portion of the linking system. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the linking system. The application may be programmed to programmatically integrate the linking system, or interface thereto, into the application. Via the one or more APIs, the application may access data from the linking system. Via the one or more APIs, the application may perform or execute any of the functions or operations of the linking system. Via the one or more APIs, the application may perform or execute any of the systems and methods described herein.

The link encoder may include an application, program, library, process, service, script, task or any type and form of executable instructions for encoding a link. The link encoder may shorten a URL. The encoded URL may be referred to or be a shortened URL. Creating a shortened link may be referred to as encoding. The link encoder may shorten the URL to a predetermined string length or to a predetermined number of characters. The link encoder may shorten the URL to a length determined responsive to the length of the URL to be encoded. The link encoder may encode the URL into an encoded URL using an encoding scheme. In some embodiments, the link encoder applies a hash to the URL to generate or produce the encoded URL. In some embodiments, the encoded URL is a hash or hash code. In some embodiments, the link encoder transforms the URL using a transformation function, such as a reversible transformation function. In some embodiments, the link encoder removes a portion of the URL. In some embodiments, the link encoder rewrites a portion of the URL with a portion of another URL. In some embodiments, the link encoder encrypts the URL or a portion of the URL using one or more encryption keys. In some embodiments, the link encoder generates a unique identifier for the encoded URL in which the unique identifier uniquely identifies the URL. In some embodiments, the link encoder obfuscates information from the original URL, such as information relating to a directory structure of the server from the URL. The link encoder may encode the URL into an encoded URL that comprises a domain name hosted by or recognized by the linking system or any server thereof. The link encoder may encode the URL into an encoded URL that comprises a domain name configured, specified or identified by a user, such as a domain name of an entity that is a user of the linking system. The link encoder may encode the URL to identify a URL of the linking system, such as a landing page or intermediate page of the linking system. In some embodiments, the link encoder may encode the URL to be resolved to an intermediate URL or page of the linking system prior to being redirected by the linking system to the URL after decoding.

The link decoder 212 may include an application, program, library, process, service, script, task or any type and form of executable instructions for decoding an encoded link. The link decoder may be designed and constructed to decode, un-shorten, generate, produce or otherwise provide the original URL corresponding to the encoded URL. Clicking on a shortened link may be referred to or called decoding. In some embodiments, the link decoder determines the URL from the encoded URL via lookup in the database. In some embodiments, the link decoder uses the encoded URL as an index to look up the URL in the database. In some embodiments, the link decoder uses the encoded URL as a hash index into a hash table of the database. In some embodiments, the link decoder users the encoded URL or a portion thereof as a unique identifier to the URL stored in memory, storage of database of the linking system. In some embodiments, the link decoder uses a decoding scheme designed and constructed to perform the reverse of the encoding scheme or otherwise produce or generate the original input (e.g., the URL) to the encoding scheme. In some embodiments, the link decoder applies a reverse transformation function to the encoded URL. In some embodiments, the link decoder replaces a portion of the encoded URL with a portion of the URL. In some embodiments, the link decoder un-obfuscates information in the encoded URL to a portion of the original URL. In some embodiments, the link decoder replaces a domain name of the encoded URL with a domain name of the URL.

In some embodiments, the linking system, such as via link decoder, generates, issues or communicates a redirect responsive to receipt of an encoded URL and/or decoding the encoded URL. In some embodiments, the linking system issues any type of 3XX HTTP redirect. In HTTP, a redirect is a response with a status code beginning with a 3XX that induces a browser to go to another location. In some embodiments, the response or status code includes an annotation describing the reason, which allows for the correct subsequent action (such as changing links in the case of code 301, a permanent change of address). In some embodiments, the linking system issues a 301 type of HTTP redirect. In some embodiments, the redirect response comprises or uses a technique for making a webpage available under many URLs. In some embodiments, the linking system uses scripting for redirection. In some embodiments, the linking system uses a refresh meta tag or HTTP refresh header technique for redirection.

In some embodiments, when the user clicks on or activates the shortened link 211, the user or browser is taken to an interstitial page of the linking system, and then using an HTTP redirect page, an intermediate website of the linking system refers the user to the final destination site of URL 204. While doing so, the intermediate website tracks from which website the user clicked on the short link, stores various user specific data, and notes any related cookies, or if there are no cookies, stores a new cookie on the user for the future.

A user of one device, such as client device 102, may share the encoded URL 211 with a plurality of users, such as users on client devices 102B-102N. A user or application may share the encoded URL by emailing the encoded URL to a user. A user or application may share the encoded URL by posting or publishing the encoded URL to a web-site. A user or application may share the encoded URL by posting, publishing or forwarding the encoded URL to a social networking site, such as but not limited to LinkedIn or Facebook. A user or application may share the encoded URL by texting the encoded URL. A user or application may share the encoded URL by posting or communicating the encoded URL via a communication tool, such as Skype or Instant Messenger. A user or application may share the encoded URL by serving the encoded URL in content served by a web-site. A user or application may share the encoded URL by serving the encoded URL in an advertisement or impression opportunity served by an ad server. A user or application may share the encoded URL via the linking system API or app 225, such as via a linking system bookmark applet on a browser. Any user receiving the encoded URL from any device may click on or activate the encoded URL to communicate with the linking system and be directed to the URL decoded from or corresponding to the encoded URL.

A click tracker 220 may include an application, program, library, process, service, script, task or any type and form of executable instructions for tracking actions regarding an encoded URL and/or decoding the encoded URL. In some embodiments, the click tracker identifies each instance of a user clicking on an encoded URL and tracks the number of clicks for the URL via the encoded URL in the database 230. In some embodiments, the click tracker identifies each instance of a user clicking on any of a plurality of encoded URLs that correspond to a URL and tracks the number of clicks for the URL via any encoded URL in the database 230. In some embodiments, the click tracker may identify and track via the database any temporal information regarding the clicks on the encoded URL, such as date and time of the click action 250. In some embodiments, the click tracker may identify and track via the database any source information regarding the clicks on the encoded URL, such a source internet protocol (IP) address, source port and Machine Access Control (MAC) identifier of the device from which the user clicked on the encoded URL. In some embodiments, the click tracker may identify and track via the database any header, field or other information via any application layer payload, such as the HTTP payload of the packet(s) carrying the click action or request to decode the URL. In some embodiments, the click tracker may identify and track via the database the HTTP header field of referrer to identify and track the URL or webpage from which the click action or request was referred or originated.

A user tracker 215 may include an application, program, library, process, service, script, task or any type and form of executable instructions for tracking and managing information regarding users of the linking system and/or users interacting with encoded and decoded URLs. The user tracker may include an interface, such as a web page, to have users register as users of the linking system. The user tracker may collect via registration authentication information of the user, such as a user identifier and a password. The user tracker may identify and collect information from any type and form of cookie 255. The user tracker may receive the cookie via a request to shorten a URL. The cookie may be any third-party cookie. The cookie may be a cookie generated by, provided by or tracked for the linking system. The user tracker or linking system may insert, modify or provide any data, information or attributes in the cookie for the linking system. The user tracker or linking system may include or provide a cookie 255' in communicating the redirect response for a click action that decodes the encored URL. The cookie may comprise information, data or attributes that identify the user, any user's actions, preferences of the user and/or history of user activity or behavior. The cookie may comprise information, data or attributes that identify any click actions. The cookie may comprise information, data or attributes that identify the URL and/or any encoding and/or decoding of the URL. The cookie may comprise information, data or attributes of redirection or the redirect response by the linking system. The user tracker may identify and track any user activity in encoding URLs. The user tracker may identify and track any user activity in decoding URLs. The user tracker may identify and track any user activity in sharing encoded URLs. The user tracker may store tracked information, data and attributes to the database.

In some embodiments, the click tracker comprises the user tracker or a portion thereof. In some embodiments, the user tracker comprises the click tracker or a portion thereof. In some embodiments, a tracker 215 or 220 comprises both the click tracker and user tracker. In some embodiments, the user tracker is integrated with, interfaced to or communicates with the click tracker. The user tracker and click tracker may be designed and constructed to track and store to the database information about encoding URLs, decoding URLs and clicks of encoded URLS in association with users connected to the encoding of the URLs, decoding of the URLS and clicking on the encoded URLs.

The database 230 may include an application, program, library, process, service, script, task or any type and form of executable instructions for tracking and managing information and data stored by, accessed by and/or used by the linking system or any modules or components thereof. The database may be any type and form of Structured Query Language (SQL) database. The database may be any type and form of object oriented or object based database. The database may be any type and form of in-memory or real-time memory database. The database may comprise any type and form of graphical database. The database may comprise any type and form of data warehousing and/or analytical database. The database may comprise any type and form of multi-dimensional database. The database may store any data and information from any of the functions, operations, systems and methods described herein.

A click analyzer 235 may include an application, program, library, process, service, script, task or any type and form of executable instructions for analyzing, searching and/or reporting any of the information, data and metrics stored by the linking system in the database 230. The click analyzer may include any type and form of online analytical processing (OLAP). The click analyzer may analyze click and user data stored in the database to determine a number of clicks to a URL per encoding of the URL. The click analyzer may analyze click and user data stored in the database to determine a number of clicks to a URL for all encodings of the URL across a plurality of users. The click analyzer may analyze click and user data stored in the database to determine a location of users who clicked on an encoded URL, such as what countries the clicks originated from. The click analyzer may analyze click and user data stored in the database to determine the different referring sites from which users clicked on an encoded URL. The click analyzer may analyze click and user data stored in the database to determine the different types of clients or client applications from which users clicked on an encoded URL. The click analyzer may analyze click and user data stored in the database to determine a number of clicks over a predetermined time period or a frequency of clicks. The click analyzer may analyze click and user data stored in the database to determine a number of conversations across different social media networks regarding or in connection with an encoded URL. The click analyzer may provide any data, information and/or analysis in a graphical format, such as any type and form of statistical charts or diagrams.

A plurality of users may click on the same encoded URL 211. Each of these users may also click on a plurality of different encoded URLs to the same URL or to different URLs. The plurality of click actions 250 may generate and/or providing data that is tracked and stored via the linking system. The set of data resulting from a click action and/or data associated with the click and/or collected, tracked, and analyzed either statically or in real-time by the linking system may be referred to as a clickstream 250' or click stream 250'. The click stream may include any data tracked by the user tracker. The click stream may include any data tracked by the click tracker, such as any network traffic data. The click stream may include any data provided by the browser. The click stream may include any data provided via the HTTP request. The click stream may include any data analyzed by the click analyzer. The click stream may include any data traversing the linking system.

C. Systems and Methods for Associating Cookies of Applications to a Device Identifier As described above, a user's clickstream can be analyzed to analyze a user's online behavior. In some embodiments, the user's clickstream is tracked by using cookies. In traditional desktop or laptop computing devices, a user may visit a large number of websites via a single browser. By providing a cookie to the browser, an entity, such as the linking system, can track the online activity of a user performed via the browser. In the recent past, with the mass adoption of smartphones, tablets and other application based computing devices, advertisers, marketers, or other entities struggle to accurately track a user's online activity. This is in part due to applications rendering content instead of the browser to which the cookie was provided.

To increase mobile application installs as well as application engagement, content publishers can generate encoded links that are capable of causing a mobile application installed on the user's device to display the content or in some embodiments, cause the computing device to provide the user an option to install the mobile application to view the content. In this way, content publishers can not only increase application installs but also increase application usage, which in turn, provides the content publisher to keep the user engaged with additional content of the content publisher.

Computing devices, such as smart phones, may include one or more identifiers that are unique to the computing device. For instance, computing devices may have a device identifier by which advertisers can identify a particular device. The device identifier can be an IDFA (identifier for advertisers). Using the IDFA or some other device identifier of a computing device, the linking system can track user activity across multiple mobile applications installed on the computing device. In some embodiments, the linking system can provide cookies to the computing device, which are then passed to one or more mobile applications installed on the computing device. The linking system can associate these cookies to the device identifier to establish a link or connection between the cookies of the linking system which may exist across multiple applications installed on the same computing device.

The present disclosure relates to systems and methods for associating cookies of a linking system to a device identifier of a computing device. A server of a linking system can receive from a browser of a computing device, a first request to access content via an encoded uniform resource locator (URL) link generated by the server and linked to a web page of the linking system. The server can redirect the browser of the computing device to the web page of the linking system. The web page of the linking system can include instructions to cause the computing device to i) determine that the application identified via the encoded URL link is installed on the computing device, ii) responsive to determining that the application identified via the encoded URL link is installed on the computing device, launch the application installed on the computing device; and iii) pass, to the application, a cookie of the linking system. The server can receive a request to associate the cookie and a device identifier of the computing device. The server can then associate the cookie with the device identifier responsive to the request.

In some aspects, the present disclosure relates to systems and methods for associating cookies of applications to a device identifier of a computing device. The server of the linking system can receive, from an application of the computing device, a request to access content via an encoded uniform resource locator (URL) link generated by the server. The request can include a device identifier of the computing device. The server can determine, using the device identifier, that the computing device is not associated with a cookie of the linking system. The server can provide, to a web browser of the computing device, a cookie of the linking system. The server can then associate the cookie of the linking system with the device identifier.

To generate a encoded URL link, a user can request the generation of an encoded URL link for content on a server. The content can be accessed on a browser of a computing device via a first URL link and via a mobile application installed on the computing device via a second URL link. The second URL link can be a mobile deep link that identifies the application through which to access the content as well as an identifier identifying a location of the content through which the content can be accessed via the application. A server of the linking system can generate an encoded URL link that is linked to a webpage of the linking system.

When the encoded URL link is served on a computing device and a user of the computing device actuates the link (by clicking on it, tapping on it or otherwise), the computing device, via the server of the linking system, is redirected to the web page of the linking system. The web page of the linking system can include a script to provide the content for display on the computing device. The script can i) determine that the application identified via the encoded URL link is installed on the computing device, ii) responsive to determining that the application identified via the encoded URL link is installed on the computing device, launch the application installed on the computing device; and iii) pass, to the application, a cookie of the linking system. If the computing device, via the script, determines that the application is not installed on the computing device, the script can cause the computing device to launch or redirect the browser of the computing device to a default web address corresponding to the first URL link.

Referring again to FIG. 2, the linking system 120 can further include a deep link identifier 310, a redirect page generator 312, and a cookie manager 315. The deep link identifier 310 may include an application, program, library, process, service, script, task or any type and form of executable instructions for identifying deep links for content. In some embodiments, the deep link identifier 130 can identify deep links for content identified by the URL included in the request 205 to encode or shorten the URL. The deep link identifier 310 can be configured to identify one or more applications via which the content can be presented on a computing device. The deep link identifier 310 can identify the applications via which the content can be presented based on a domain name included in the original URL included in the request 205 provided to the linking system 120. The linking system can identify applications of the domain name across multiple operating systems and computing device types. In some embodiments, the linking system can identify mobile applications designed for the Android operating system, for the iOS operating system of APPLE COMPUTERS, the Windows mobile platform, among others. In some embodiments, the linking system can identify mobile applications designed for different types of computing devices, such as smartphones, tablets, ultrabooks, among others.

The deep link identifier 310 can identify URIs associated with each of the different applications corresponding to the domain of the URL identified in the request 205. At least a portion of the URI can be used by the computing device to identify the application with which to present the content. For instance, twitter:// is the iOS URI to launch Twitter's mobile application and YouTube:// is the iOS URI to launch YouTube's mobile app.

In some embodiments, the deep link identifier 310 can identify one or more deep links from the request 205. In some embodiments, the deep link identifier 310 can identify one or more deep links from the client 102A that provided the request 205. In some embodiments, a user of the client device 102A can provide the one or more deep links.

The link encoder 210 of the linking system 120 can receive a request to shorten a URL 205. Responsive to receiving the request, the link encoder 210 can, via the deep link identifier 310, identify one or more deep links with which the URL included in the request 205 can be accessed. Each of the deep links can be specific to a particular type of computing device, for example, a smart phone, a tablet, among others.

The redirect page generator 312 may include an application, program, library, process, service, script, task or any type and form of executable instructions for generating a web page of the linking system to which to redirect a user responsive to the user clicking on the encoded URL. The redirect page generator 312 can generate the web page in response to receiving a request from a user to encode, shorten or otherwise process a URL link to content. The generated web page can be stored and maintained on a server of the linking system and the link decoder 212 can be configured to associate the URL of the generated web page with the encoded URL link. In this way, when a user clicks the encoded URL link, the linking system redirects a browser of the computing device of the user to the web page of the linking system.

The redirect page generator 312 can be configured to include a script in the web page. The script can be configured to cause the computing device of the user that clicked on the link to i) determine that the application identified via the encoded URL link is installed on the computing device, ii) responsive to determining that the application identified via the encoded URL link is installed on the computing device, launch the application installed on the computing device, and iii) pass, to the application, a cookie of the linking system. The script can be generated in response to the deep link identifier 130 identifying deep links for content identified by the URL included in the request 205 to encode or shorten the URL.

The script can identify one or more deep links via which the content can be accessed. The script can include instructions to determine if one or more of the applications corresponding to the deep links is installed on the computing device. In some embodiments, the script can determine if a mobile application is installed on the computing device by generating a request to launch the mobile application and waiting for a response. In some embodiments, the computing device can generate a notification indicating that the application is not installed on the computing device. In some embodiments, the computing device can generate a notification indicating that the application is available to be installed on the computing device.

The script can be configured to cause the computing device to launch the application in response to determining that the application is installed on the computing device. The script can cause the computing device to prompt a user to select whether to access the content via the application or via a browser of the computing device. The script can then be configured to access the content via the deep link of the application.

The script can be configured to determine if the computing device from which the request 205 was received has previously received a cookie from the linking system. The script can determine if the computing device from which the request 205 was received has previously received a cookie from the linking system by inspecting the request. In some implementations, the script can identify a cookie issued by the linking system in the request 205. In some implementations, the cookie may previously have been provided to the computing device in response to a request to access a web page via a encoded link of the linking system.

The script can be configured to generate a cookie and pass the generated cookie to the computing device responsive to determining that the computing device from which the request 205 was received does not have a cookie from the linking system. The script can, via the linking system, provide a cookie to the browser of the computing device from which the request 205 was received. In some implementations, the cookie is specific to the browser or application through which the request 205 was generated and transmitted. The cookie can be passed to the browser or application in a response to the request 205.

The browser on the computing device can present the web page of the linking system. In some embodiments, the web page may not be visible for display, but rather, executes the script without providing any content for display. The browser can, via execution of the script, open a mobile application deep link if the mobile application is installed. The browser can then pass the cookie of the linking system to the mobile application.

The cookie manager 315 may include an application, program, library, process, service, script, task or any type and form of executable instructions for managing cookies of the linking system 120. The cookie manager 315 can be configured to generate one or more cookies of the linking system. The cookie manager 315 can be configured to maintain one or more databases for cookie management. In some implementations, one or more of the databases 230 may be utilized by the cookie manager 315 to maintain cookie information for a plurality of device identifiers.

The cookie manager 315 can be configured to associate one or more cookies to a device identifier of a computing device. In some embodiments, the cookie manager 315 can establish an association between the cookie and the device identifier. In some embodiments, the cookie manager 315 can establish the association by creating an entry including the cookie and the device identifier in a database, such as the database 230. In some embodiments, the cookie manager 315 can identify one or more other cookies with which the device identifier is associated and can establish an association of the cookie with the device identifier as well as other cookies with which the device identifier is already associated. In some embodiments, the cookie manager 315 can identify an application to which the cookie is associated and store the identity of the application in the database. In some embodiments, the cookie manager 315 can determine the identity of the application from one or more components of the linking system, or from the request to associate the cookie with the device identifier.

The cookie manager 315 can associate cookies to the device identifier of a computing device in response to a request to associate the cookie to the device identifier. In some embodiments, the request to associate the cookie to the device identifier can be received by the linking system. The request can be received in response to a mobile application opening a deep link via an encoded URL link of the linking system.

The database managed by the cookie manager 315 can include a plurality of entries. Each entry can include the cookie (or an identifier of the cookie) as well as the device identifier with which to associate the cookie. The entry can also include a date and time the cookie was provided to the computing device, a date and time the cookie was last accessed, modified, and/or updated, as well as the identity of the application or browser for which the cookie was set.

In some embodiments, the cookie manager 315 can maintain a single entry per device identifier. As new cookies are set for applications or web browsers installed on the computing device corresponding to the device identifier, the cookie manager 315 can identify the entry including the device identifier and update the entry to include the cookie (or the cookie identifier) passed to the application or web browser.

Figure 3A:
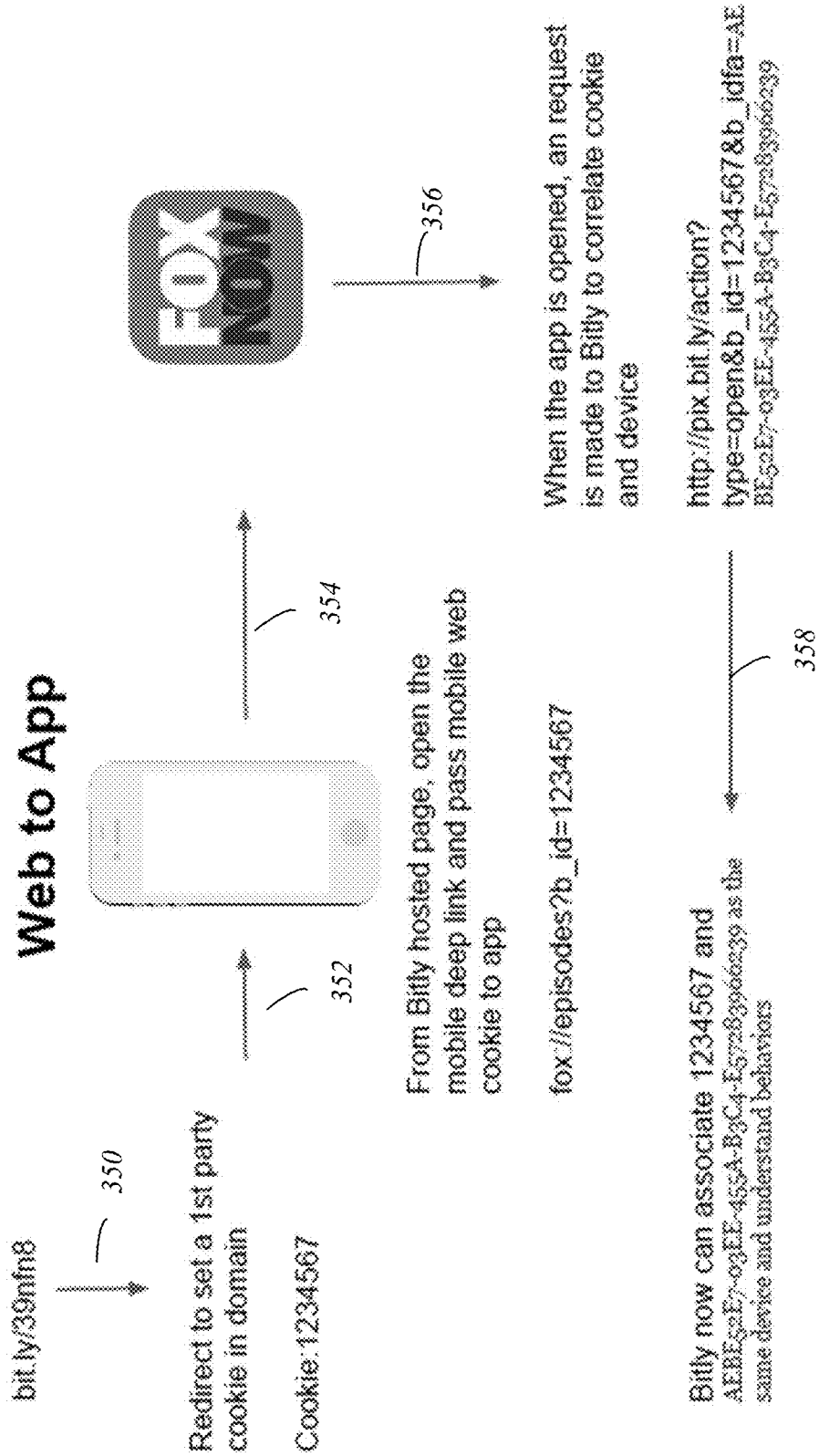
FIG. 3A illustrates a logical flow of operations to associate a cookie of the linking system with a device identifier of the computing device.

FIG. 3A illustrates a logical flow of operations to associate a cookie of the linking system with a device identifier of the computing device. As shown in FIG. 3A, the linking system receives, from a browser of the computing device, a request 205 to decode an encoded URL link (shown as bit.ly/39nfn8) (350). The linking system, in response to the request, can identify if the request 205 included a cookie of the linking system. The linking system can redirect the browser of the computing device to a web page of the linking system to which the encoded URL link is linked (352). The linking system can redirect the browser of the computing device to the web page of the linking system to set a first party cookie in the domain corresponding to the encoded URL link. As shown in FIG. 3A, the cookie is represented as "1234567." The web page of the linking system can include a script to i) determine that the application identified via the encoded URL link is installed on the computing device, ii) responsive to determining that the application identified via the encoded URL link is installed on the computing device, launch the application installed on the computing device, and iii) pass, to the application, a cookie of the linking system. The script can cause the computing device to open the mobile application deep link by launching the mobile application with which the deep link is associated (354). The script can then cause the browser to pass the first party cookie '1234567' to the mobile application. As shown in FIG. 3A, the mobile deep link used to launch the mobile application is represented by "fox://episodes?b_1234567."

Still referring to FIG. 3A, when the mobile application (in the example of FIG. 3A, the Fox Now app) is launched, the mobile application, via the computing device, transmits an association request to the linking system (356). The association request is a request to associate or otherwise correlate the first party cookie of the linking system to the computing device. The association request can be represented by "http://pix.bitly/action?type=open&b_id=1234567&b_idfa=AEBE52E7-03EE-455A-B3C4-E57283966239." The association request can include a device identifier of the computing device. In some embodiments, the device identifier can be an IDFA (identifier for advertisers). The IDFA can be issued by the device manufacturer and can be unique to the computing device.

Responsive to the linking system receiving the association request, the linking system can associate the cookie '1234567' to the device identifier "AEBE52E7-03EE-455A-B3C4-E57283966239" (358). The cookie 1234567 can be used to track the user's behavior on the 'Fox Now' mobile application installed on the computing device.

It should be appreciated that the linking system can encode a plurality of URL links that are associated with a large number of mobile applications. If the user requests to access a second encoded URL that is associated with a second mobile application, the linking system can then provide a second first-party cookie that will be passed to the second mobile application installed on the computing device. When the second mobile application is launched responsive to the linking system receiving the request to access the second encoded URL, the second mobile application can transmit a second association request to associate the second first-party cookie with the device identifier of the computing device. The linking system can then associate the second cookie with the device identifier. As the device identifier is already associated with the first cookie, the linking system can associate the second cookie with the first cookie as well.

Figure 3B:
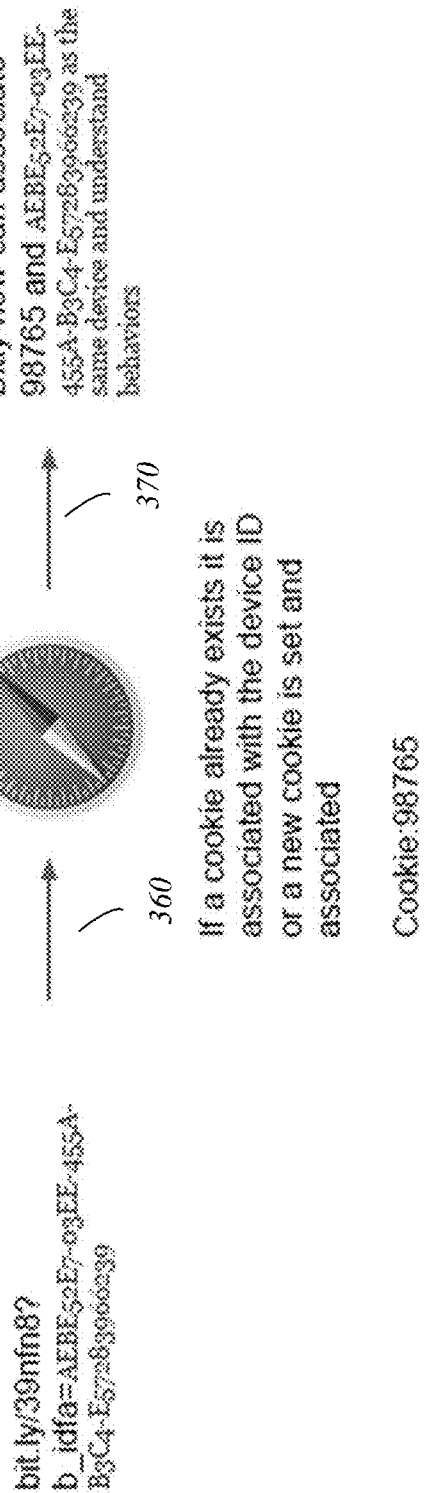
FIG. 3B illustrates a logical flow of operations to associate a cookie of the linking system with a device identifier of the computing device.

Referring now to FIG. 3B, FIG. 3B illustrates a logical flow of operations to associate a cookie of the linking system with a device identifier of the computing device. The logical flow shown in FIG. 3B begins when the linking system receives a request to access content that identifies a device identifier of the computing device. The request can be represented as bit.ly/39nfn8?b_idfa=AEBE52E7-03EE-455AB3C4-E57283966239. The user of the computing device can cause the computing device to transmit this request in response to the user clicking on or otherwise taking an action on the encoded URL bit.ly/39nfn8. In some embodiments, the user can take an action on the encoded URL via a mobile application installed on the computing device with which there is no cookie of the linking system associated. In some embodiments, the user can take an action on the encoded URL via a mobile application installed on the computing device to which the linking system has previously passed a cookie of the linking system. In some embodiments, the request transmitted by the computing device to the linking system can include the cookie.

In some other embodiments, in response to the linking system receiving the request, the linking system can determine that the computing device has previously received the cookie of the linking system.

Responsive to the linking system receiving the request to access content on a web browser of the computing device via the mobile application installed on the computing device (step 360), the linking system can determine if a cookie of the linking system already exists for the web browser. If a cookie (for example, cookie '98765') of the linking system already exists for the web browser, the linking system can associate the cookie with the device identifier of the computing device (step 370). If a cookie of the linking system does not already exist for the web browser on which the content is to be provided for display, the linking system can set a cookie for the web browser. The linking system can then associate or otherwise correlate the cookie of the linking system set for the web browser with the device identifier of the computing device. In this way, the linking system can track the behavior of the user of the computing device via the web browser. Further, since the linking system can maintain a database that includes association information of web browsers and mobile applications installed on a computing device with a device identifier of the computing device, the linking system can, via the associations, track or monitor the behavior of the user across different applications and web browsers executing on the computing device.

Figure 4A:
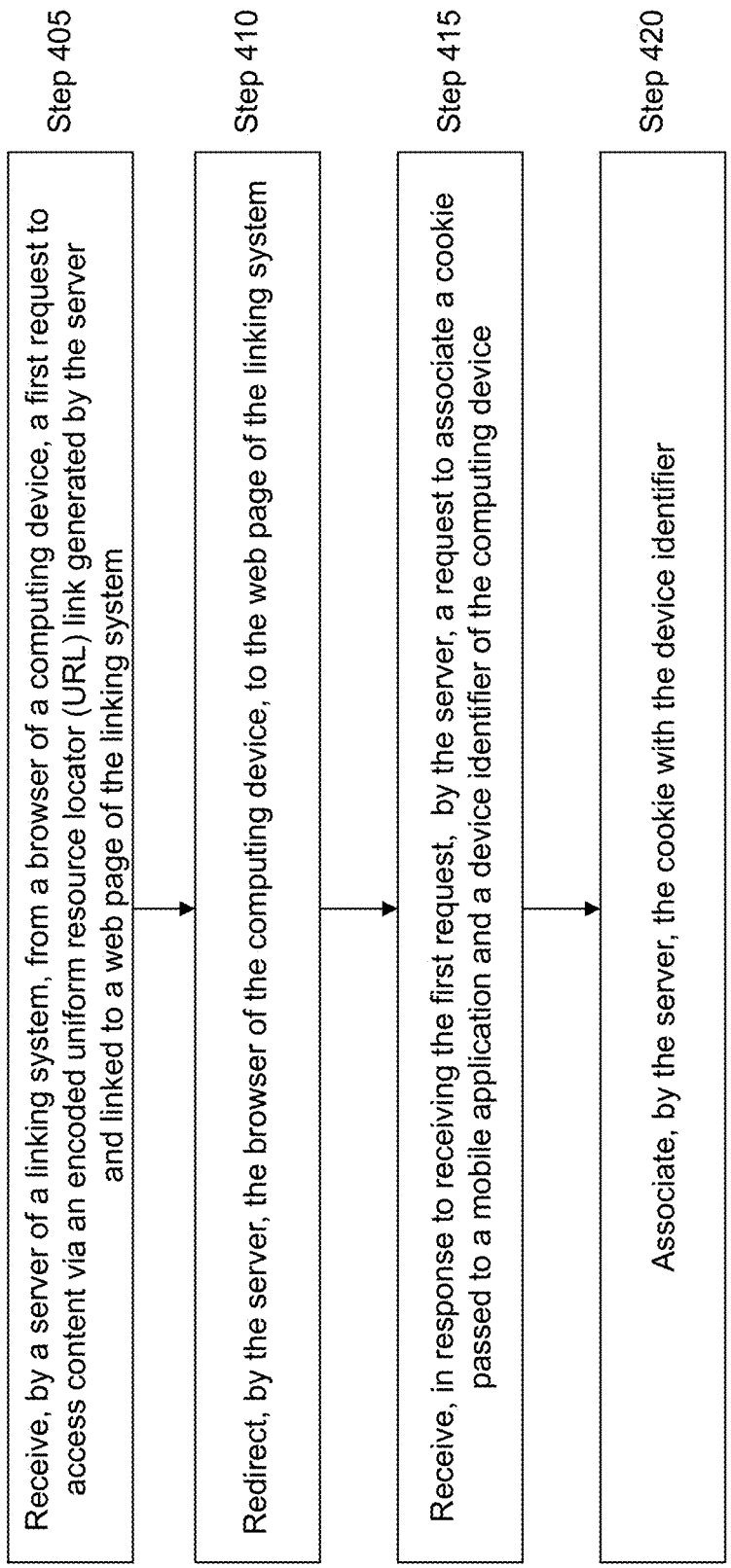
FIG. 4A is a block diagram of an embodiment of a system for associate cookies of a linking system to a device identifier of a computing device.

Referring now to FIG. 4A, a method for associating cookies of applications to a device identifier of a computing device is depicted. The method of FIG. 4A corresponds to the association of a cookie with a device identifier responsive to passing a cookie to a mobile application installed on a computing device. In brief overview, a server of a linking system, such as the linking system 120 described with respect to FIGS. 1A-3B, can receive, from a browser of a computing device, a first request to access content via an encoded uniform resource locator (URL) link generated by the server and linked to a web page of the linking system (step 405). The server can redirect the browser of the computing device to the web page of the linking system (step 410). The server can receive a request to associate a cookie passed to a mobile application installed on the computing device with a device identifier of the computing device (step 415). The server can then associate the cookie with the device identifier (step 420).

In further detail, the server can receive, from a browser of a computing device, a first request to access content via an encoded uniform resource locator (URL) link generated by the server and linked to a web page of the linking system (step 405). The linking system can receive a request to access an encoded URL. The encoded URL can be generated by the linking system and linked to a web page of the linking system that is configured to cause the computing device to present the content associated with the encoded URL. The content associated with the URL can be presented via a mobile application installed on the computing device that corresponds to a content publisher of the content, or via a browser of the computing device.

Responsive to receiving the request to access the encoded URL, the server can redirect the browser of the computing device to the web page of the linking system (step 410). The linking system can generate a web page of the linking system to which to redirect a user responsive to the user clicking on the encoded URL. The linking system can generate the web page in response to receiving a request from a user to encode, shorten or otherwise process a URL link to content. The generated web page can be stored and maintained on a server of the linking system and the linking system can associate the URL of the generated web page with the encoded URL link. In this way, when a user clicks the encoded URL link via a browser (or web view of a mobile application), the linking system redirects a browser (or the web view of a mobile application) of the computing device of the user to the web page of the linking system.

The linking system can include a script in the web page. The script can be configured to cause the computing device of the user that clicked on the link to i) determine that the application identified via the encoded URL link is installed on the computing device, ii) responsive to determining that the application identified via the encoded URL link is installed on the computing device, launch the application installed on the computing device, and iii) pass, to the application, a cookie of the linking system. The script can be generated in response to the linking system identifying deep links for content identified by the URL included in the request to encode or shorten the URL.

The script can identify one or more deep links via which the content can be accessed. The script can include instructions to determine if one or more of the applications corresponding to the deep links is installed on the computing device. In some embodiments, the script can determine if a mobile application is installed on the computing device by generating a request to launch the mobile application and waiting for a response. In some embodiments, the computing device can generate a notification or response indicating that the application is not installed on the computing device. In some embodiments, the computing device can generate or otherwise provide a notification indicating that the application is available to be installed on the computing device.

The script can be configured to cause the computing device to launch the application in response to determining that the application is installed on the computing device. The script can cause the computing device to prompt a user to select whether to access the content via the application or via a browser of the computing device. The script can then be configured to access the content via the deep link of the application.

The script can be configured to determine if the computing device from which the request was received has previously received a cookie from the linking system. The script can determine if the computing device from which the request was received has previously received a cookie from the linking system by inspecting the request. In some implementations, the script can identify a cookie issued by the linking system in the request. In some implementations, the cookie may previously have been provided to the computing device in response to a request to access a web page via a encoded link of the linking system.

The script can be configured to generate a cookie and pass the generated cookie to the computing device responsive to determining that the computing device from which the request 205 was received does not have a cookie from the linking system. The script can, via the linking system, provide a cookie to the browser of the computing device from which the request was received. In some implementations, the cookie is specific to the browser or application through which the request was generated and transmitted. The cookie can be passed to the browser or application in a response to the request.

The browser on the computing device can present the web page of the linking system. In some embodiments, the web page may not be visible for display, but rather, executes the script without providing any content for display. In some embodiments, the web page can be an interstitial page that is presented prior to the rendering of the content. The browser can, via execution of the script, open a mobile application deep link if the mobile application is installed. The browser can then pass the cookie of the linking system to the mobile application.

The server can receive a request to associate a cookie passed to a mobile application installed on the computing device with a device identifier of the computing device (step 415). The server can receive the request to associate the cookie in response to the computing device launching the mobile application to access the content corresponding to the encoded URL link and the computing device passing the cookie to the mobile application. The mobile application, upon being launched, can transmit a request to the server of the linking system to associate or otherwise correlate the cookie passed to the mobile application with a device identifier of the computing device. The device identifier of the computing device can be an identifier for advertisers (IDFA) or in some embodiments, any other device identifier unique to the computing device.

Responsive to the server receiving the request to associate the cookie with the device identifier, the server can associate the cookie with the device identifier (step 420). The linking system can associate one or more cookies to a device identifier of a computing device. In some embodiments, the linking system can establish an association between the cookie and the device identifier. In some embodiments, the linking system can establish the association by creating an entry including the cookie and the device identifier in a database. In some embodiments, the linking system can identify one or more other cookies with which the device identifier is associated and can establish an association of the cookie with the device identifier as well as other cookies with which the device identifier is already associated. In some embodiments, the linking system can identify an application to which the cookie is associated and store the identity of the application in the database. In some embodiments, the linking system can determine the identity of the application from one or more components of the linking system, or from the request to associate the cookie with the device identifier.

Figure 4B:
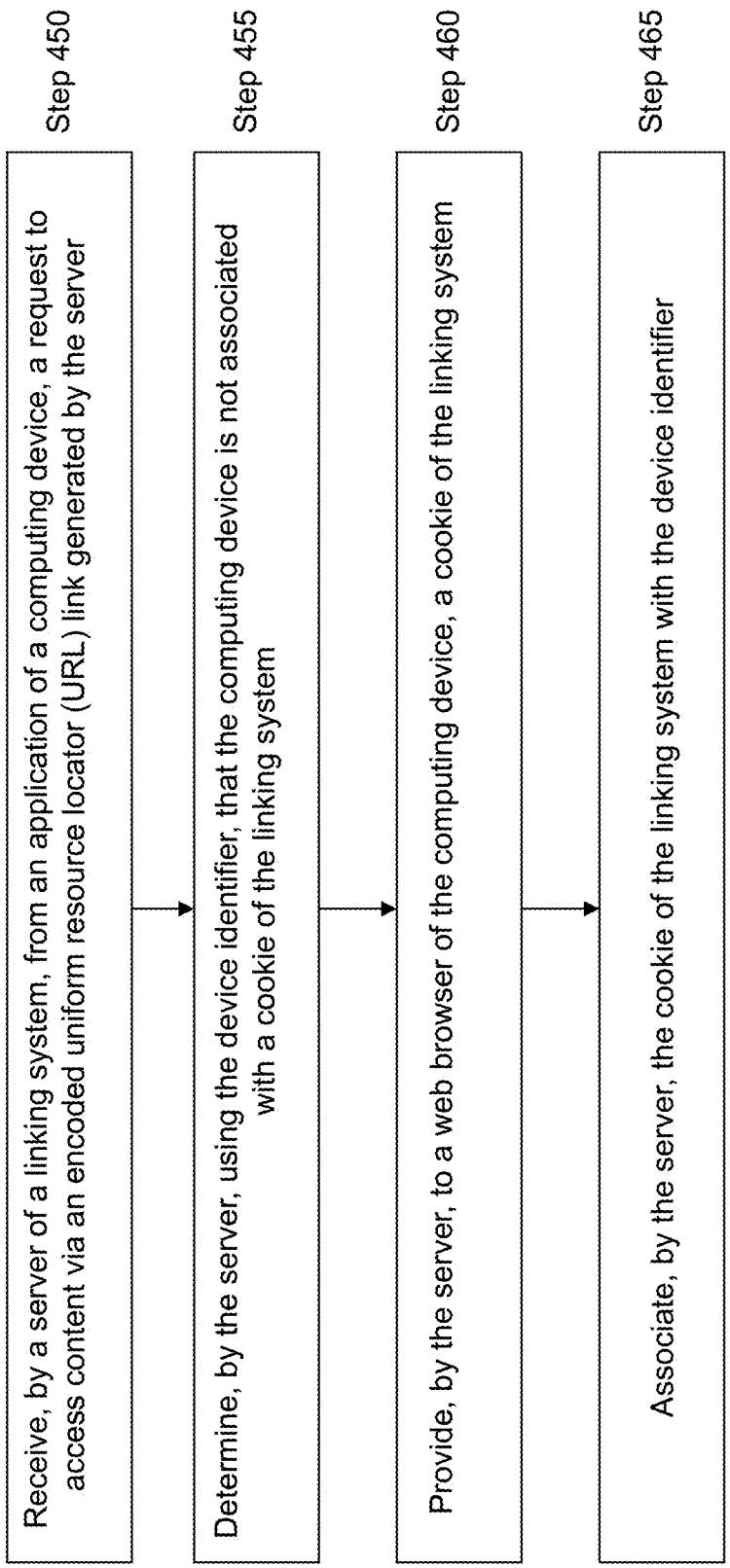
FIG. 4B is a flow diagram of an embodiment of a method for associate cookies of a linking system to a device identifier of a computing device.

Referring now to FIG. 4B, a method for associating cookies of the linking system to a device identifier of a computing device is depicted. The method of FIG. 4B corresponds to the association of a cookie of the linking system with a device identifier responsive to passing a cookie to a web browser installed on a computing device. In brief overview, a server of a linking system, such as the linking system 120 described with respect to FIGS. 1A-3B, can receive, from an application of a computing device, a request to access content via an encoded uniform resource locator (URL) link generated by the server (step 450). The request can include a device identifier of the computing device. The server can determine, using the device identifier, that the computing device is not associated with a cookie of the linking system (step 455). The server can provide, to a web browser of the computing device, a cookie of the linking system (step 460). The server can then associate, by the server, the cookie of the linking system with the device identifier (step 465).

In further detail, the server of the linking system can receive, from an application of a computing device, a request to access content via an encoded uniform resource locator (URL) link generated by the server (step 450). The request can include a device identifier of the computing device. The encoded URL link can be linked to a webpage of the server. The encoded URL link can be associated with a deep link to a second mobile application that may or may not be installed on the computing device as well as a default web view URL address. The request to access content can be received from a mobile application installed on the computing device of a user. The request can be generated in response to the user taking an action on the encoded URL link displayed within a web view of the mobile application or within a page of the mobile application.

The server of the linking system can redirect the computing device (or a browser of the computing device or a web view of an application via which the user accessed the encoded URL link) to a web page corresponding to the encoded URL link. The web page of the linking system can include one or more scripts configured to cause the computing device to determine that the mobile application of the computing device with which the encoded URL link is associated is not installed on the computing device and to provide, responsive to determining that the mobile application of the computing device is not installed on the computing device, an option to install the application or access the content via a browser of the computing device. The script can be configured to further receive a selection, from the computing device, to access the content via a web browser of the computing device, and responsive to the selection, set, by the server, the cookie of the linking system to the browser on which the content is to be accessed by the computing device.

The server of the linking system can determine, using the device identifier, that the computing device is not associated with a cookie of the linking system (step 455). In some embodiments, the server of the linking system can perform a lookup in a database using the device identifier as a key. If no cookies of the linking system are associated with the device identifier, the server can determine that no cookies of the linking system are associated with the device identifier.

The server of the linking system can provide, to a web browser of the computing device, a cookie of the linking system (step 460). In some embodiments, the server of the linking system can provide the cookie to the web browser in response to the computing device receiving an input from the user indicating that the content be displayed via the browser of the computing device. The script of the web page generated by the linking system can then cause the computing system to pass the cookie of the linking system to the browser of the computing device via which the content is to be presented.

The server of the linking system can then associate, by the server, the cookie of the linking system with the device identifier (step 465). In some embodiments, the server can associate the cookie of the linking system with the device identifier by updating, in a database, an entry including the device identifier to include the cookie passed to the web browser. In this way, the database can include an association between the device identifier and a cookie of the linking system.

It should be understood that any of the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA or in any script language, such as Python or TCL. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method of associating cookies to device identifiers of computing devices, comprising:

receiving, by a server of a linking system from a computing device, a request to access a first webpage via an encoded uniform resource locator (URL) provided by the linking system to the computing device;

providing, by the server of the linking system responsive to receiving the request to access, a second webpage of the linking system to the computing device, the second webpage including a script to cause a browser on the computing device to:

store, on the computing device, a browser-specific cookie generated by the linking system for the browser, and send, to the server of the linking system, responsive to accessing the first webpage, a request to associate the browser-specific cookie with a device identifier of the computing device, the request including an cookie identifier corresponding to the browser-specific cookie and the device identifier;

receiving, by the server of the linking system, the request to associate the browser-specific cookie with the device identifier of the computing device;

associating, by the server of the linking system, using the cookie identifier included in the request to associate, the browser-specific cookie with the device identifier; and monitoring, by the server of the linking system via the browser-specific cookie associated with the device identifier, activity of a plurality of applications and the browser on the computing device across one or more webpages accessed via one or more encoded URLs provided by the linking system using at least one of the plurality of applications or the browser.

2. The method of claim 1, further comprising:
determining, by the server responsive to receiving the request to access, that the browser on the computing device is not associated with any browser-specific cookie based on the device identifier; and
generating, by the server responsive to determining that the browser is not associated any browser-specific cookie, the browser-specific cookie to pass to the browser.

3. The method of claim 1, further comprising:
determining, by the server responsive to receiving a second request to access a third webpage via second encoded URL from the browser of the computing device, that the browser has the browser-specific cookie based on the device identifier; and
associating, by the server responsive to determining that the browser has the browser-specific cookie, the browser with the browser-specific cookie.

4. The method of claim 1, wherein redirecting he browser further comprises redirecting the browser of the computing device to the second webpage causing the browser to:
determine that the browser on the computing device does not have any browser-specific cookies; and
send, to the linking system, the request to associate responsive to determining that the browser does not have any browser-specific cookies.

5. The method of claim 1, wherein redirecting the browser further comprises redirecting the browser of the computing device to the second webpage causing the browser to pass the browser-specific cookie via presentation of the first webpage.

6. The method of claim 1, wherein associating the browser-specific cookie with the device identifier further comprises associating the browser-specific cookie with one or more other cookies generated by the linking system for the computing device based on the device identifier.

7. The method of claim 1, wherein monitoring the activity further comprises monitoring, using the browser-specific cookie, the activity on the computing device across one or more of a plurality of applications executing on the computing device.

8. The method of claim 1, wherein receiving the request to access further comprises receiving, from an application executing on the computing device, the request to access the first webpage via the encoded URL using the browser on the computing device.

9. The method of claim 1, further comprising inserting, by the server, a script into the second webpage of the linking system for the encoded link, the script configured to cause the computing device to be redirected to the second webpage of the linking system to pass the browser-specific cookie to the browser.

10. The method of claim 1, further comprising storing, by the server on a database, an association between the browser and the device identifier, responsive to associating the browser-specific cookie with the device identifier.

11. A system for associating cookies to device identifiers of computing devices, comprising:
at least one server of a linking system having one or more processors coupled with memory, configured to:
receive, from a computing device, a request to access a first webpage via an encoded uniform resource locator (URL) provided by the linking system to the computing device;
provide, responsive to receiving the request to access, a second webpage of the linking system to the computing device, the second webpage including a script to cause a browser on the computing device to:
store, on the computing device, a browser-specific cookie generated by the linking system for the browser, and
send, to the at least one server of the linking system, responsive to accessing the first webpage, a request to associate the browser-specific cookie with a device identifier of the computing device, the request including an cookie identifier corresponding to the browser-specific cookie and the device identifier;
receive the request to associate the browser-specific cookie with the device identifier of the computing device;
associate, using the cookie identifier included in the request to associate, the browser-specific cookie with the device identifier; and
monitor, via the browser-specific cookie associated with the device identifier, activity of a plurality of applications and the browser on the computing device across one or more webpages accessed via one or more encoded URLs provided by the linking system using at least one of the plurality of applications or the browser.

12. The system of claim 11, wherein the at least one server is further configured to:
determine, responsive to receiving the request to access, that the browser on the computing device is not associated with any browser-specific cookie based on the device identifier; and
generate, responsive to determining that the browser is not associated any browser-specific cookie, the browser-specific cookie to pass to the browser.

13. The system of claim 11, wherein the at least one server is further configured to:
determine, responsive to receiving a second request to access a third webpage via second encoded URL from the browser of the computing device, that the browser has the browser-specific cookie based on the device identifier; and
associate, responsive to determining that the browser has the browser-specific cookie, the browser with the browser-specific cookie.

14. The system of claim 11, wherein the at least one server is further configured to redirect the browser of the computing device to the second webpage causing the browser to:
determine that the browser on the computing device does not have any browser-specific cookies; and
send, to the linking system, the request to associate responsive to determining that the browser does not have any browser-specific cookies.

15. The system of claim 11, wherein the at least one server is further configured to redirect the browser of the computing device to the second webpage causing the browser to pass the browser-specific cookie via presentation of the first webpage.

16. The system of claim 11, wherein the at least one server is further configured to associate the browser-specific cookie with one or more other cookies generated by the linking system for the computing device based on the device identifier.

17. The system of claim 11, wherein the at least one server is further configured to monitor, using the browser-specific cookie, the activity on the computing device across one or more of a plurality of applications executing on the computing device.

18. The system of claim 11, wherein the at least one server is further configured to receive, from an application executing on the computing device, the request to access the first webpage via the encoded URL using the browser on the computing device.

19. The system of claim 11, wherein the at least one server is further configured to insert a script into the second webpage of the linking system for the encoded link, the script configured to cause the computing device to be redirected to the second webpage of the linking system to pass the browser-specific cookie to the browser.

20. The system of claim 11, wherein the at least one server is further configured to store, on a database, an association between the browser and the device identifier, responsive to associating the browser-specific cookie with the device identifier.

\* \* \* \* \*